United States Patent [19]

Miyazawa

[11] Patent Number: 5,642,508
[45] Date of Patent: Jun. 24, 1997

[54] DISTRIBUTED CONTROL METHOD AND APPARATUS FOR JOB EXECUTION

[75] Inventor: Hiroshi Miyazawa, Tokyo, Japan

[73] Assignee: NEC Corporation, Tokyo, Japan

[21] Appl. No.: 251,424

[22] Filed: May 31, 1994

[30] Foreign Application Priority Data

May 31, 1993 [JP] Japan ................................. 5-152697

[51] Int. Cl.$^6$ ................................................. G06F 9/00
[52] U.S. Cl. ................................... 395/674; 395/676
[58] Field of Search ............................... 395/650, 674, 395/676; 364/230.3, 281.3

[56] References Cited

U.S. PATENT DOCUMENTS

| | | | |
|---|---|---|---|
| 4,809,157 | 2/1989 | Eilert et al. | 395/650 |
| 4,843,541 | 6/1989 | Bean et al. | 364/200 |
| 4,918,595 | 4/1990 | Kahn et al. | 395/650 |
| 5,193,186 | 3/1993 | Tamaki et al. | 395/650 |
| 5,247,674 | 9/1993 | Kogure | 395/650 |
| 5,297,283 | 3/1994 | Kelly, Jr. et al. | 395/650 |

OTHER PUBLICATIONS

"ACOS-4/XVP Job Management Reference Manual", DDA81E-2, NEC Corporation, 1992, pp. 3-15 to 3-22.

*Primary Examiner*—Thomas M. Heckler
*Assistant Examiner*—Dennis M. Butler
*Attorney, Agent, or Firm*—Young & Thompson

[57] ABSTRACT

A system distributed control managing section 2, at the time of starting the execution of a job 12, generates a job control distributed managing section 3-1, and allocates a number of processes to it. A job control statement managing section 5, in advance of executing a program in the job 12, manages the processing to distribute a plurality of job control statements 12 into a plurality of processes for analysis and execution in parallel. A resource securement managing section 6, in advance of executing a program to be actuated by a program control statement 14, manages the processing to distribute a required plurality of program-used resources 15 into a plurality of processes for securing in parallel. A resource release managing section 7 manages the processing to distribute a plurality of program-used resources 15 whose use has been completed into a plurality of processes for releasing in parallel.

9 Claims, 5 Drawing Sheets

DISTRIBUTED CONTROL METHOD AND APPARATUS FOR JOB EXECUTION

BACKGROUND OF THE INVENTION

1. Field of the Invention

The present invention relates to a control technique for job execution in a computer system which can co-execute a plurality of processing functions, and more particularly to a distributed control method and apparatus for job execution to distribute the processing of job control statements or the processing to secure or release resources into a plurality of discrete processes and to accomplish them in parallel.

2. Description of Related Art

According to the related art, in distributed control of job execution in a computer system able to execute a plurality of processes, a plurality of jobs are simultaneously executed in parallel in discrete processes, and no consideration is given to the distribution of the steps of processing at the start and end of each program within one job.

The processing time of a job includes not only the total sum of the periods taken by the execution of programs at different steps stated within a job but also those taken by the steps of processing at the start and end of each program. Thus, at the start of each program, analysis and execution of a plurality of job control statements are required, and at the same time processing to secure resources schedule for use by the program is also needed. Furthermore, at the time of ending each program, processing to release the resources used by the program is also required.

The techniques for executing the processing to secure resources at the time of starting a program consecutively in a single process are disclosed in "ACOS-4/XVP Job Management Reference Manual", DDA81E-2, NEC Corporation, 1992, pp. 3–15 to 3–22.

In this related art, there is the problem that the total processing time for securing resources at the time of starting a program will increase in proportion to the total number of the resources secured. Moreover, until the processing to secure a resource currently under way is completed, securing the next resource, even though available, cannot be processed, and accordingly a long time is required to secure all the needed resources. The same is true of the release of resources. Furthermore, though some job control statements, typically file management statements, permit parallel processing, analysis and execution of job control statements, as long as accomplished in a single process, have to be processed consecutively and the time taken to execute each single job is not reduced.

SUMMARY AND OBJECTS OF THE INVENTION

An object of the invention is to reduce the processing time of a job that includes a plurality of programs.

Another object of the invention is to execute the processing to secure resources at the start and to release them at the end of a program, which essentially does not require consecutive processing in the execution of a job, using a plurality of discrete processes which are processed in parallel.

A further object of the invention is to execute various job control statements, which do not need consecutive processing, into a plurality of discrete processes which are processed in parallel.

A first embodiment of the distributed control method for job execution in a computer system which can co-execute a plurality of processing functions includes:

a step to have a plurality of processes analyze and execute in parallel in a distributed manner, in advance of the execution of a program in a job, a plurality of job control statements.

A second embodiment includes:

a step to have a plurality of processes secure in parallel in a distributed manner, in advance of the start of execution of a program to be actuated by a program control statement in a job, a plurality of resources scheduled for use by the program.

A third embodiment includes:

a step to have a plurality of processes release in parallel in a distributed manner, at the time of ending the execution of a program actuated by a program control statement in a job, a plurality of resources used by the program.

A fourth embodiment includes at least two of the following three stages:

(1) a stage to distribute, in advance of the execution of a program in a job, a plurality of job control statements into a plurality of processes for parallel analysis and execution;

(2) a stage to distribute, in advance of the start of execution of a program to be actuated by a program control statement in a job, a plurality of resources scheduled for use by the program into a plurality of processes for parallel securing;

(3) a stage to distribute, at the end of execution of a program actuated by a program control statement in a job, a plurality of resources used by the program into a plurality of processes for parallel releasing.

A fifth embodiment in combination with the fourth embodiment is characterized in that the number of processes usable in the execution of each job is determined as designated by the user.

A sixth embodiment in combination with the fourth embodiment is characterized in that the number of processes usable in the execution of each job is automatically determined according to the number of resources required by each job and the number of job control statements of each job.

A seventh embodiment in combination with the fifth embodiment is characterized in that individual ones of a plurality of processes usable in the execution of each job are allocated to said plurality of stages for their exclusive use.

An eighth embodiment in combination with the sixth embodiment is characterized in that individual ones of a plurality of processes usable in the execution of each job are allocated to said plurality of stages for their exclusive use.

A ninth embodiment in combination with the fifth embodiment is characterized in that individual ones of a plurality of processes usable in the execution of each job can be commonly used by said plurality of stages.

A tenth embodiment in combination with the sixth embodiment is characterized in that individual ones of a plurality of processes usable in the execution of each job can be commonly used by said plurality of stages.

An eleventh embodiment of the distributed control apparatus for job execution in a computer system which can co-execute a plurality of processing functions is provided with:

a system distributed control managing section for managing the system's maximum distributable number, which is the number of processes allocable for distributed control in job execution in the whole computer system; upon start of execution of each job, generating a job control distributed managing section and allocating it to the job; at the same time allocating a number of processes to said job control distributed managing section; and upon completion of the job, eliminating that job control distributed managing section;

said job control distributed managing section having at least one of the following three managing sections including:

a job control statement managing section for managing the processing to distribute, in advance of the execution of a program in a job, a plurality of job control statements into a plurality of processes for parallel analysis and execution;

a resource securement managing section for managing the processing to distribute, in advance of the start of execution of a program to be actuated by a program control statement in a job, a plurality of resources scheduled for use by the program into a plurality of processes for parallel securing; and a resource release managing section for managing the processing to distribute, at the end of execution of a program actuated by a program control statement in a job, a plurality of resources used by the program into a plurality of processes for parallel releasing.

BRIEF DESCRIPTION OF THE DRAWINGS

The above mentioned and other objects, features and advantages of the present invention will become more apparent from the following detailed description when taken in conjunction with the accompanying drawings, wherein.

In the drawings, identical reference numerals indicate similar components.

DETAILED DESCRIPTION OF PREFERRED EMBODIMENTS

Next, an embodiment of the invention will be described in detail with reference to the drawings.

Figure 1:
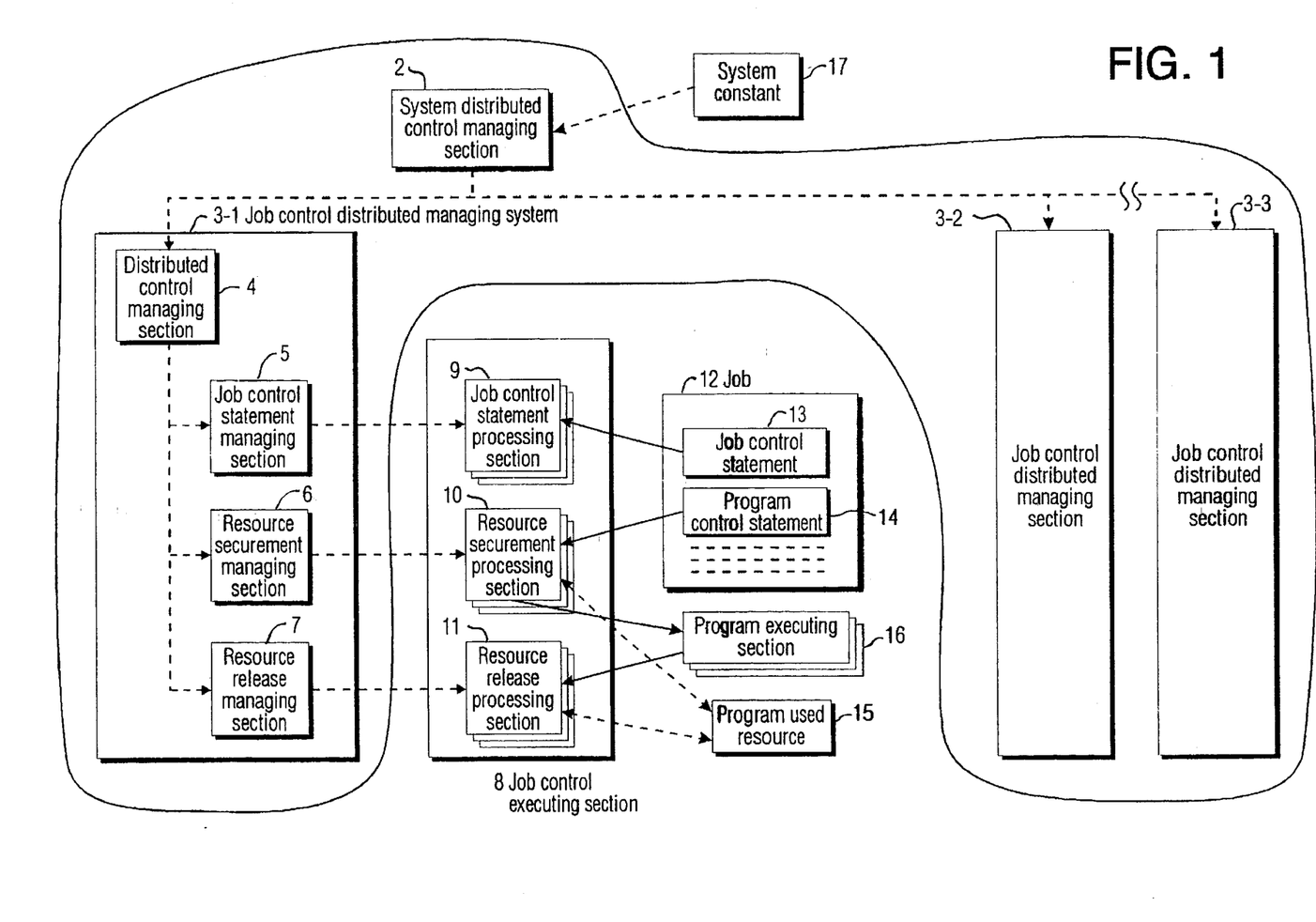
FIG. 1 is a block diagram of an embodiment of the invention.

FIG. 1 illustrates parts of a preferred embodiment of the invention related to the implementation of a distributed control method in the execution of jobs, i.e. a distributed control mechanism 1, a job control executing section 8, a job 12, program-used resources 15, a program executing section 16 and a system constant 17.

The distributed control mechanism 1, for executing the principal part of the distributed control in job execution, has a system distributed control managing section 2 for the management of distributed processing within the system, and job control distributed managing sections 3-1, 3-2 and 3-3 for the management of distributed processing within each job. Each of the job control distributed managing sections 3-1 through 3-3, as illustrated within the job control distributed managing section 3-1 in FIG. 1, comprises a distributed control managing section 4, a job control statement managing section 5, a resource securement managing section 6 and a resource release managing section 7.

The job control executing section 8, which is to execute the processing of job control, comprises job control statement processing sections 9 managed by the job control statement managing section 5, a resource securement processing section 10 managed by the resource securement managing section 6, and a resource release processing section 11 managed by the resource release managing section 7.

The job 12, put into the computer system and converted into its internal form, consists of a plurality of job control statements 13 processed by the job control statement processing sections 9 in advance of program execution, and a program control statement 14. Execution of the program described in the program control statement 14 is accomplished by the program executing section 16. The program-used resources 15 are such resources used by the program as the main storage area, files and magnetic tape units.

Figure 3:
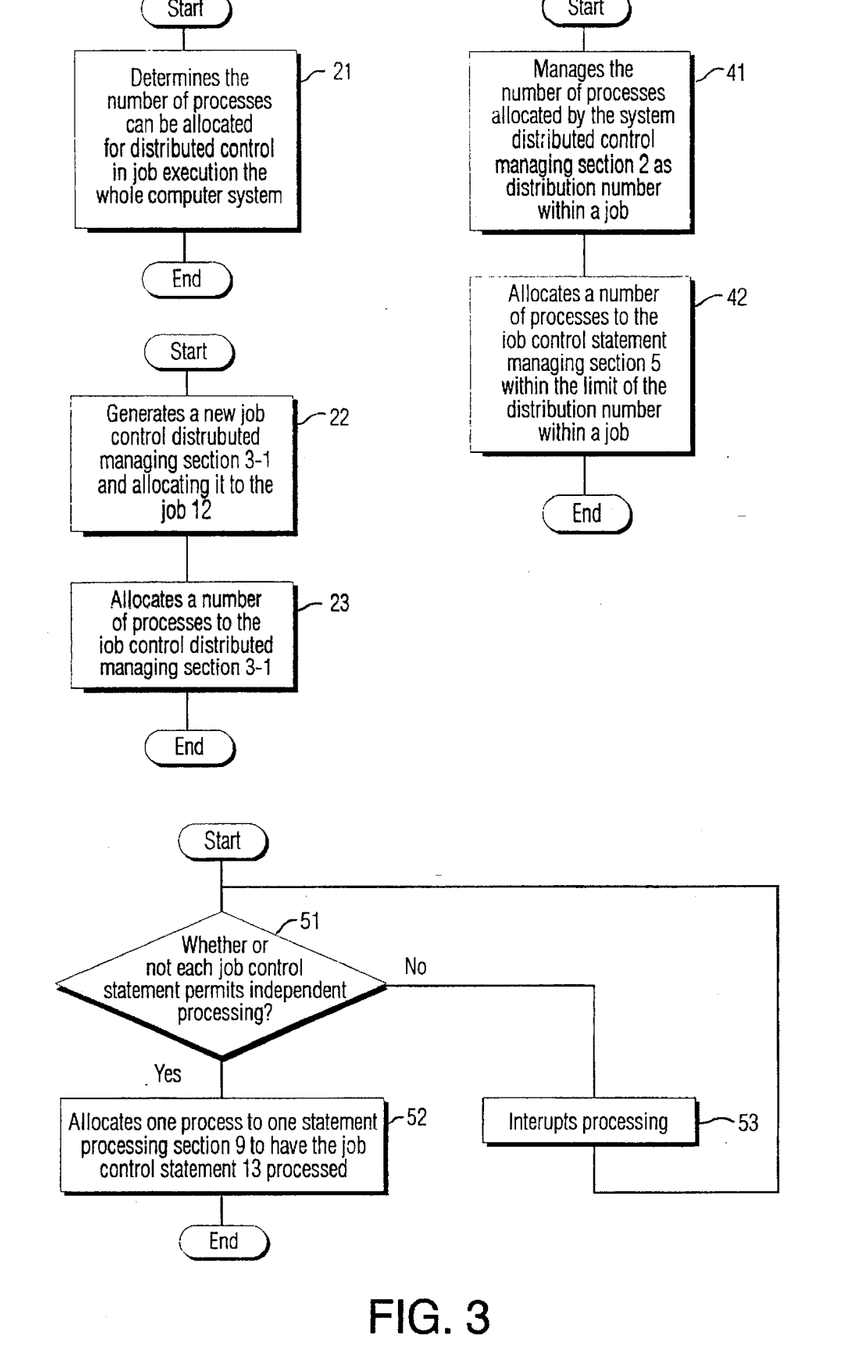
FIG. 3 is a flow chart showing the processing by the system distributed control managing section 2, the distributed control managing section 4, and the job control statement managing section 5 in an embodiment of the invention.

The functions and operations of the constituent sections will be described below with reference to FIG. 3.

At the time the computer system is started, the system distributed control managing section 2 of the distributed control mechanism 1 is actuated.

The system distributed control managing section 2 determines the number of processes that can be allocated for distributed control (the system's maximum distributable number) in job execution in the whole computer system (step 21 ). The user can accomplish this by assigning the system's maximum distributable number at the time of starting up the system. However, in this embodiment the system distributed control managing section 2, referring to such information as the maximum number of processes in the system based on the hardware constraint of the system constant 17 and other conditions, automatically determines, as the system's maximum distributable number, the difference between the number of processes needed for other controls and the maximum number of processes.

Afterwards, when the execution of the job 12 is started at the user's request, the system distributed control managing system 2 dynamically generates a new job control distributed managing section (e.g. 3-1) and allocates it to the job 12 (step 22). At this time the system distributed control managing section 2 allocates a number of processes to the job control distributed managing section 3-1 (step 23). The number of processes to be allocated is determined for example by one of the following methods:

(a) A method pursuant to the number of processes per job designated by the user at the time of starting up the system.

(b) A method to allocate correspondingly more processes to jobs needing more resources or having more job control statements according to the number of resources to be used by a given job or the number of job control statements it has in order to take account of the overall balance in the system, i.e. the balance between that particular job and other jobs. By this method, as long as the system's maximum distributable number is large enough and unless there is a delay in processing time due to a specific reason such as waiting for an available resource, the time required per job for pre- and post-processing can be kept uniform irrespective of the number of job control statements or resources. Conceivable methods to detect the number of resources to be used by a job or the number of job control statements it has, include a method wherein, in the process of converting a job in an external form into an internal form to generate a job 12, job control statements are analyzed to determine the numbers of required resources and of job control statements and the system distributed control managing section 2 refers to these numbers, besides a method by which the system distributed control managing section 2 refers to information on the numbers of resources and of job control statements separately designated by the user and detects their numbers.

The distributed control managing section 4 of the job control distributed managing section 3-1 generated by the system distributed control managing section 2 manages the number of processes allocated by the system distributed control managing section 2 as distribution number within a job (step 41).

The distributed control managing section 4, first to process the job control statements 13 of the job 12, allocates a number of processes to the job control statement managing section 5 within the limit of the distribution number within a job (step 42).

The job control statement managing section 5 causes the job control statements 13 of the job 12 to be processed by having the job control statement processing sections 9 executed in the individual processes allocated by the distributed control managing section 4.

More specifically, the job control statement managing section 5, with respect to the job control statements 13 to be processed, judges one by one in the sequence of their appearance, whether or not each job control statement permits independent processing (step 51); and if it does, allocates one process to one job control statement processing section 9 to have the job control statement 13 processed (step 52); interrupts processing if there appears a job control statement which cannot be independently processed, i.e. one which cannot be processed until the processing of the preceding job control statement is completed, or if there is no more processes available for use (step 53); and repeats the aforementioned steps of processing when there appears a job control statement which has been made processable by the completion of the processing of the preceding job control statement or the processing of an earlier job control statement is completed to make a process available. The judgment of whether or not a statement can be independently processed can be accomplished mechanically at the time of converting the job 12 into an internal form, and the result of judgment is made available for reference by the job control statement managing section 5, or the user can give a separate instruction.

Figure 2:
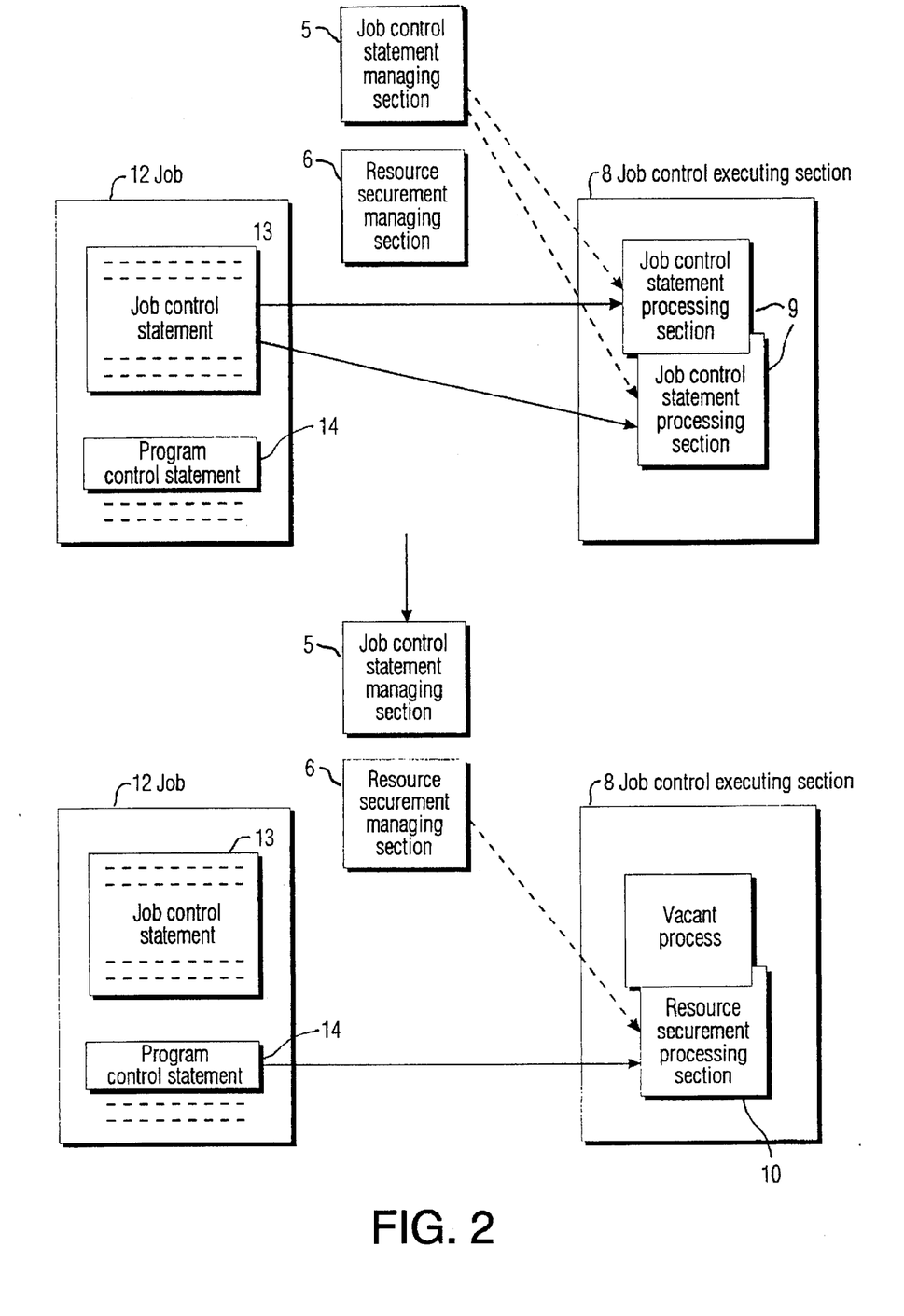
FIG. 2 is a diagram illustrating an example of allocation of programs according to an embodiment of the invention.

The foregoing operations, as illustrated in the upper half of FIG. 2, cause independently processable job control statements among the job control statements 13 to be processed in parallel in a distributed manner by a plurality of job control statement processing sections 9, which are operated by the job control statement managing section 5 on separate processes.

Figure 4:
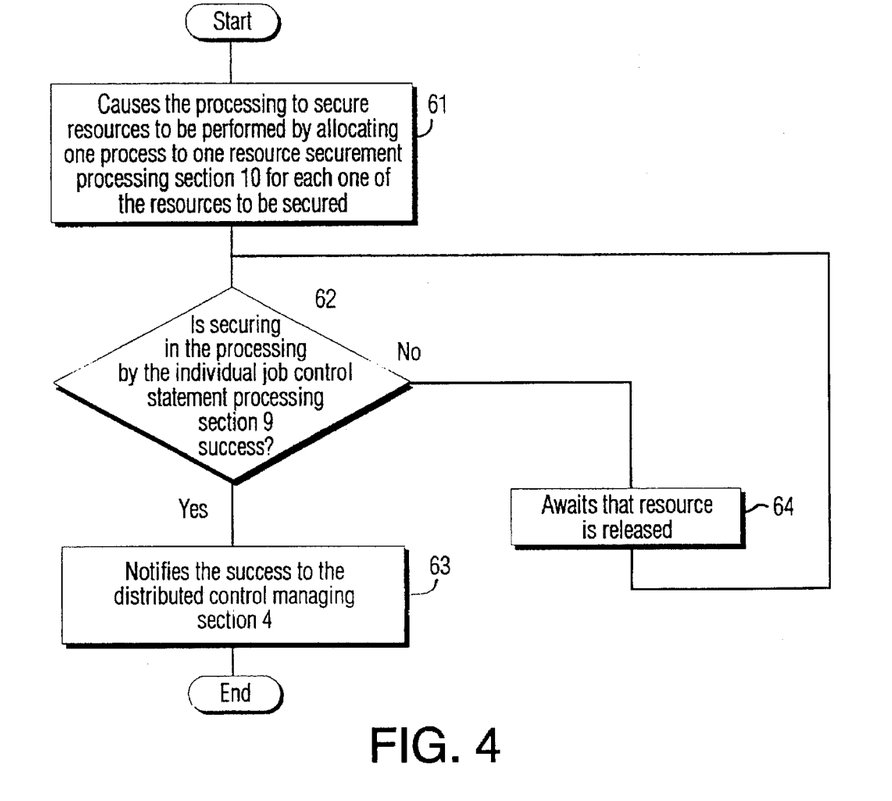
FIG. 4 is a flow chart showing the processing by the distributed control managing section 4 and the resource securement managing section 6 in an embodiment of the invention.

Next, with reference to FIG. 4, when securing various program-used resources 15 needed for execution of a program in connection with the start of execution of the program defined by a program control statement 14 in the job 12, the distributed control managing section 4 allocates a number of processes to the resource securement managing section 6 within the limit of the distribution number within a job (step 43), and the resource securement managing section 6 causes the processing to secure the needed resources to be performed by the resource securement processing section 10 in the allocated individual processes.

More specifically, the resource securement managing section 6 causes the processing to secure resources to be performed by allocating one process to one resource securement processing section 10 for each one of the resources which need to be secured for the execution of the pertinent program in their listed sequence (step 61). In the processing to secure resources, such steps of processing are performed as sending a request to secure resources to a resource managing section (not shown) which collectively manages the resources of the system.

If the number of resources is too great for allocating one process for each resource to one resource securement processing section 10, one process for a number of resources as a unit may be allocated to the resource securement processing section 10 and, when a process allocated to the resource securement processing section 10 becomes vacated, that vacant process may be allocated to the resource securement processing section 10 to secure another resource.

In this embodiment, the distributed control managing section 4 collectively manages processes to be allocated to the job control statement managing section 5, the resource securement managing section 6, and the resource release managing section 7 not as processes specific to the pertinent processing sections but as processes which can be used for some other processing when not in use by these sections. Therefore, each of the processes used by the job control statement processing sections 9 shown in the upper half of FIG. 2 is managed as a vacant process as soon as processing by the pertinent processing section 9 is completed and, as shown in the lower half of FIG. 2, the vacant process is allocated to the resource securement managing section 6 for use by the resource securement processing section 10. Similarly, a process previously used but no longer used by the resource securement processing section 10 can be used by a job control statement processing section 9 or the resource release processing section 11, or a process previously used but no longer used by the resource release processing section 11 can be used by a job control statement processing section 9 or the resource securement processing section 10. The present invention, however, is not limited to these instances, and instead the individual processes may be allocated for exclusive use by the sections 5 through 7.

The resource securement managing section 6 judges success or failure in the processing by the individual job control statement processing sections 9 to secure resources (step 62) and, upon successful securement of all the program-used resources 15 needed for the operation of the program, notifies this success to the distributed control managing section 4 (step 63). In the event of failure to secure any of the program-used resources 15, the resource securement managing section 6 awaits when that resource is released (step 64). In this case, the resources already secured are once released by the resource release processing section 11 under management by the resource release managing section 7.

The distributed control managing section 4, which is notified of the success from the resource securement managing section 6 in step 63, causes the program executing section 16 to start executing the program (step 44).

Figure 5:
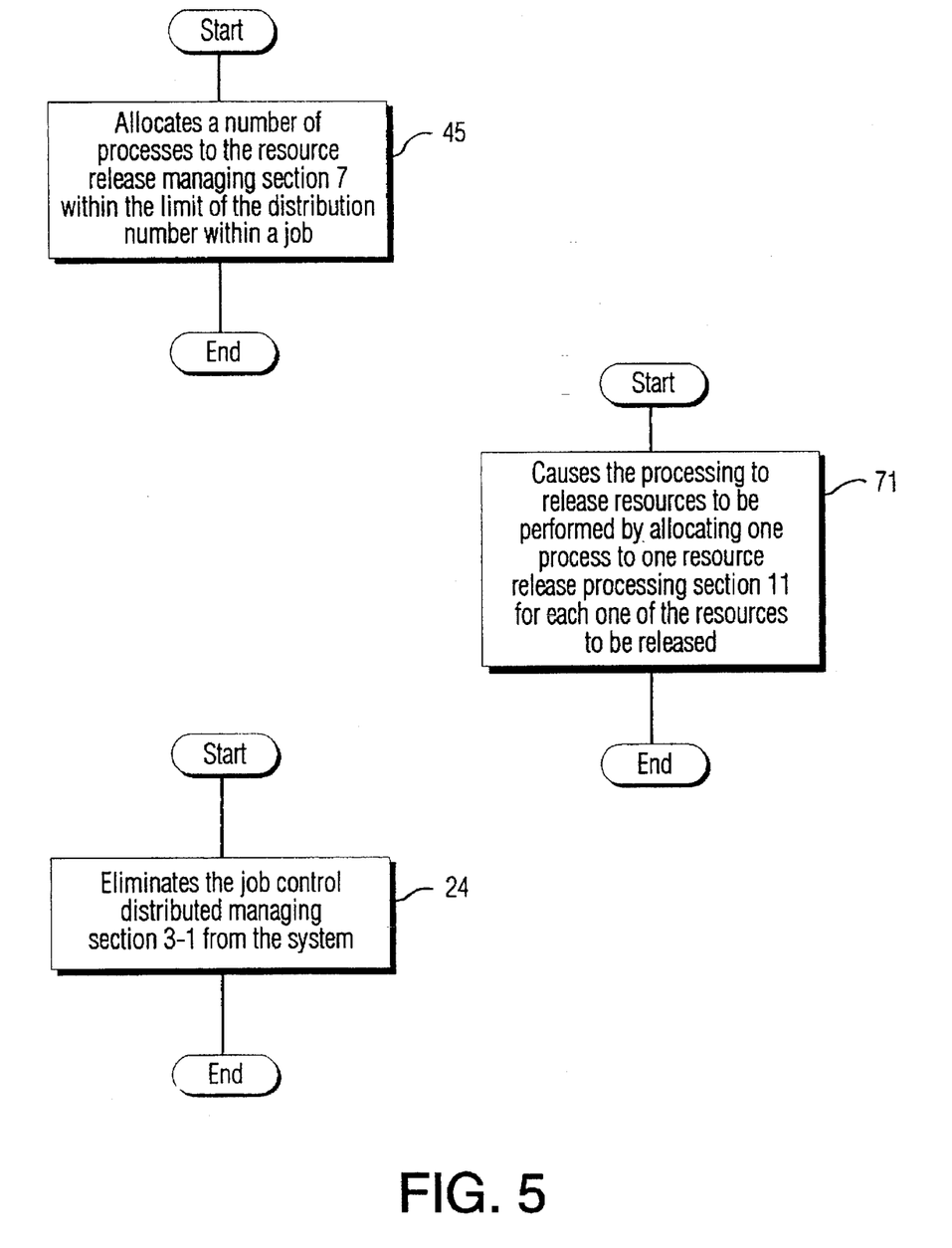
FIG. 5 is a flow chart showing the distributed control managing section 4, the resource release managing section 7, and the system distributed control managing section 2 in an embodiment of the invention.

Afterwards, with reference to FIG. 5, upon completion of program execution, in order to release the secured resources, the distributed control managing section 4 allocates a number of processes to the resource release managing section 7 within the limit of the distribution number within a job (step 45), and causes the release of the secured resources to be processed.

More specifically, the resource release managing section 7 causes the processing to release resources to be performed by allocating one process to one resource release processing section 11 for each one of the resources to be released (step 71). In the processing to release resources, such steps of processing are performed as sending a request to release resources to a resource managing section (not shown) which collectively manages the resources of the system.

If the number of resources is too great for allocating one process for each resource to one resource release processing section 11, one process for a number of resources as a unit may be allocated to the resource release processing section 11 and, when a process allocated to the resource release processing section 11 becomes vacated, that vacant process may be allocated to the resource release processing section 11 to release another resource.

As the foregoing operations are performed and the job 12 is thereafter completed, the system distributed control managing section 2 eliminates the job control distributed managing section 3-1 from the system (step 24).

The foregoing operations are performed similarly on other jobs than the job 12 and on other job control distributed managing sections than 3-1, e.g. 3-2 and 3-3.

As hitherto described, a principal feature of the invention is that the distributed control method for job execution in a computer system which can co-execute a plurality of processing functions includes at least one of the following three steps:

(1) a stage to distribute, in advance of the execution of a program in a job, a plurality of job control statements into a plurality of processes for parallel analysis and execution;

(2) a stage to distribute, in advance of the start of execution 9 of a program to be actuated by a program control statement in a job, a plurality of resources scheduled for use by the program into a plurality of processes for parallel securing;

(3) a stage to distribute, at the end of execution of a program actuated by a program control statement in a job, a plurality of resources used by the program into a plurality of processes for parallel releasing.

The above-mentioned features of the invention can provide the following benefits:

the processing time, of a job including a plurality of programs is reduced; and as the processing to secure resources at the start and to release them at the end of a program, which essentially does not require consecutive processing in the execution of a job, is executed by distributing into a plurality of discrete processes for parallel processing, the processing to secure or release resources is completed in a short period of time and accordingly the execution of the job itself is completed in a short period, whereby the possibility of competition for resources with other jobs is correspondingly reduced, making it possible to shorten the job execution time of the whole process.

Furthermore, as a plurality of job control statements, which do not need consecutive processing, are executed by distributing into a plurality of discrete processes for parallel processing, the periods of time required to analyze and execute the job control statements are reduced, resulting in a corresponding saving in job processing time.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A distributed control method for job execution in a computer system which can co-execute a plurality of processing functions, said method comprising:

allocating a plurality of processes to secure, in parallel and in a distributed manner, in advance of the start of execution of a program to be actuated by a program control statement in a job, a plurality of resources scheduled for use by the program, a separate one of said plurality of processes being allocated to secure each of said plurality of resources.

2. A distributed control method for job execution in a computer system which can co-execute a plurality of processing functions, said method comprising:

allocating a plurality of processes to release, in parallel and in a distributed manner, at the time of ending an execution of a program actuated by a program control statement in a job, a plurality of resources used by the program, a separate one of said plurality of resources being allocated to release each of said plurality of resources.

3. A distributed control method for job execution in a computer system which can co-execute a plurality of processing functions, said method comprising at least two of the following three steps:

(1) distributing, in advance of the execution of a program in a job, a plurality of processes to a plurality of job control statements within a job for parallel analysis and execution, a separate one of said plurality of processes being distributed to each of said plurality of job control statements;

(2) distributing, in advance of the start of execution of a program to be actuated by a program control statement in a job a plurality of processes to a plurality of resources scheduled for use by the program for parallel securing, a separate one of said plurality of processes being distributed to each of said plurality of resources;

(3) distributing, at an end of execution of a program actuated by a program control statement in a job, a plurality of processes to a plurality of resources used by the program for parallel releasing, a separate one of said plurality of processes being distributed to each of said plurality of resources.

4. A distributed control method as claimed in claim 3, wherein a number of processes usable in the execution of each job is determined as designated by the user.

5. A distributed control method as claimed in claim 3, wherein the number of processes usable in the execution of each job is automatically determined according to a number of resources required by each job, said number of resources being determined by analysis of said job control statements and a number of job control statements of each job.

6. A distributed control method as claimed in claim 4, wherein individual ones of a plurality of processes usable in the execution of each job are allocated to one of said three distributing steps for its exclusive use.

7. A distributed control method as claimed in claim 5, wherein individual ones of a plurality of processes usable in the execution of each job can be commonly used in any of said three distributing steps.

8. A distributed control method as claimed in claim 5, wherein individual ones of a plurality of processes usable in the execution of each job can be commonly used in any of said three distributing steps.

9. A distributed control apparatus for job execution in a computer system which can co-execute a plurality of processing functions, said apparatus comprising:

a system distributed control managing section for managing a system maximum distributable number, said maximum distributable number being a number of processes allocable for distributed control in job execution in the whole computer system; upon start of execution of each job, for generating a job control distributed managing section and allocating it to the job; at the same time allocating a number of processes to said job control distributed managing section; and upon completion of the job, eliminating that job control distributed managing section;

said job control distributed managing section having at least one of the following three managing sections:

a job control statement managing section for managing processing to distribute, in advance of the execution of a program in a job, a plurality of processes to a plurality of job control statements for parallel analysis and execution a separate one of said plurality of processes being distributed to each of said plurality of job control statements;

a resource securement managing section for managing processing to distribute, in advance of a start of execution of a program to be actuated by a program control statement in a job, a plurality of processes to a plurality of resources scheduled for use by the program for parallel securing, a separate one of said plurality of processes being distributed to each of said plurality of resources to be secured; and a resource release managing section for managing processing to distribute, at an end of execution of program actuated by a program control statement in a job, a plurality of processes to a plurality of resources used by the program for parallel releasing, a separate one of said plurality of processes being distributed to each of said plurality of resources to be released.

* * * * *